US 6,510,653 B1

(12) United States Patent
Workum et al.

(10) Patent No.: US 6,510,653 B1
(45) Date of Patent: Jan. 28, 2003

(54) FLOWER POT ASSEMBLY WITH UNIVERSAL TRAY

(75) Inventors: Paul Workum, Orlando, FL (US); Mitchell W. Workum, Winter Springs, FL (US); Victoria A. Talmadge, Maitland, FL (US)

(73) Assignee: Enviroworks, Inc., Apopka, FL (US)

( * ) Notice: Subject to any disclaimer, the term of this patent is extended or adjusted under 35 U.S.C. 154(b) by 0 days.

(21) Appl. No.: 10/017,215

(22) Filed: Dec. 14, 2001

(51) Int. Cl.[7] .................................................. A01G 9/02
(52) U.S. Cl. ....................................................... 47/655
(58) Field of Search ........................... 47/66.6, 71, 79, 47/65.5, 81; D11/143, 152, 155

(56) References Cited

U.S. PATENT DOCUMENTS

| 132,808 A | * 11/1872 | Currier .................. 248/346.11 |
| 2,206,694 A | 7/1940 | Greene ............................ 47/38 |
| 2,770,957 A | * 11/1956 | Bronson .................. 220/23.83 |
| 3,381,410 A | 5/1968 | Potain ............................. 47/38 |
| 4,020,592 A | 5/1977 | Saunders ......................... 47/71 |
| 4,092,804 A | 6/1978 | Morris et al. ................... 47/66 |
| 4,109,415 A | 8/1978 | Hall ................................ 47/67 |
| 4,167,080 A | 9/1979 | Mickelson ...................... 47/71 |
| 4,170,089 A | * 10/1979 | Smrt ................................ 47/67 |
| 4,208,836 A | 6/1980 | Kramer ........................... 47/72 |
| 4,299,055 A | 11/1981 | Dziewulski et al. ............ 47/66 |
| 4,315,382 A | * 2/1982 | Kay et al. ........................ 47/71 |
| 5,010,687 A | 4/1991 | Hougard ......................... 47/79 |
| 5,481,826 A | * 1/1996 | Dickinson et al. .............. 47/39 |
| 5,638,638 A | 6/1997 | Moskowitz ..................... 47/71 |
| 5,649,386 A | * 7/1997 | Rynberk ..................... 248/310 |
| 5,743,045 A | 4/1998 | Hicks ............................. 47/71 |
| 5,819,469 A | * 10/1998 | Hsu ................................ 47/39 |
| 5,870,855 A | 2/1999 | Hougaard .................... 47/65.5 |
| 6,047,499 A | 4/2000 | Staas .............................. 47/71 |
| 6,125,580 A | 10/2000 | Fan ................................ 47/80 |
| 6,134,832 A | 10/2000 | Bokmiller et al. ........... 47/66.1 |
| D435,481 S | 12/2000 | Wagner ..................... D11/152 |
| 6,339,899 B1 | * 1/2002 | Lehmann .................... 47/65.5 |

FOREIGN PATENT DOCUMENTS

| AU | 648801 | * 1/1992 | ............ A01G/9/02 |
| DE | 3728621 | * 1/1989 | ............ A01G/9/04 |
| JP | 2001112349 | * 4/2001 | ............ A01G/9/04 |
| NL | 8801153 | * 12/1988 | .................... 47/71 |

* cited by examiner

Primary Examiner—Peter M. Poon
Assistant Examiner—Son T. Nguyen
(74) Attorney, Agent, or Firm—Marshall J. Brown; Foley & Lardner

(57) ABSTRACT

A flower pot arrangement, comprising a base and a flower pot. The base includes at least one side wall and a bottom surface engaging the at least one side wall and forming a holding region therewith. The bottom surface includes a plurality of ribs and a plurality of projections protruding into the holding region. The flower pot includes a lower surface and a side wall. The lower surface have a plurality of channels and a plurality of depressions. When the flower pot is in a first position, the plurality of ribs on the bottom surface of the base mate with the plurality of channels on the flower pot and the plurality of projections on the bottom surface of the base mate with the depressions on the flower pot. When the flower pot is in a second position, the plurality of projections on the bottom surface of the base mate with the depressions on the flower pot while the plurality of ribs on the bottom surface of the base do not mate with the plurality of channels on the flower pot.

21 Claims, 4 Drawing Sheets

FLOWER POT ASSEMBLY WITH UNIVERSAL TRAY

FIELD OF THE INVENTION

The present invention relates generally to the field of plant pots. More particularly, the present invention relates to flower pots and their associated trays that are compatible in a variety of positions.

BACKGROUND OF THE INVENTION

A variety of pots or similar containers for storing and housing a variety of plants are conventionally known. A typical "flower pot" assembly includes a pot and a tray. The bottom of the pot rests on the upper surface of the tray, adding to both the aesthetic appeal and the overall stability of the flower pot assembly. Additionally, the tray serves to collect water, dirt and portions of the plant if and when they fall out of the pot, reducing the amount of spillage of materials.

Although such flower pots are well known, such conventional flower pot assemblies include a number of limitations. For example, it is often desirable to place the pot in a number of different positions relative to the tray. In particular, there are occasions where it is beneficial for the user to lock the pot in place relative to the base, adding to the overall stability of the flower pot. At other times, however, the user may desire to fix the position of the pot without "locking" the pot in position, such as when the user may have to remove the pot from the tray on a regular basis. On other occasions, the user may not want to fix the position of the pot at all relative to the base. Although many conventional flower pot assemblies may be able to accommodate one of these positions, it is desirable to have a flower pot that can accommodate all of the positions.

Another limiting feature of conventional flower pot assemblies is the lack of an ability to "mix and match" different flower pots with different trays. Because many flower pot trays have idiosyncratic ridges, grooves, depressions or projections on at least one surface thereof, the use of a base with an unassociated flower pot often will result in an unstable arrangement, increasing the likelihood that the pot will tip over.

SUMMARY OF THE INVENTION

It is therefore an object of the invention to provide an improved flower pot assembly that permits a user to employ the tray of one flower pot system with the flower pot of another system.

It is another object of the invention to provide an improved flower pot assembly wherein the pot can be secured to the base in a variety of manners.

It is still another object of the present invention to provide an improved flower pot assembly with an improved degree of stability.

It is yet another embodiment of the present invention to provide an improved flower pot assembly that is relatively inexpensive to manufacture.

Further advantages and features of the present invention will be apparent from the following specification, drawings, and claims illustrating the preferred embodiments of the present invention.

DETAILED DESCRIPTION OF PREFERRED EMBODIMENTS

Figure 1:
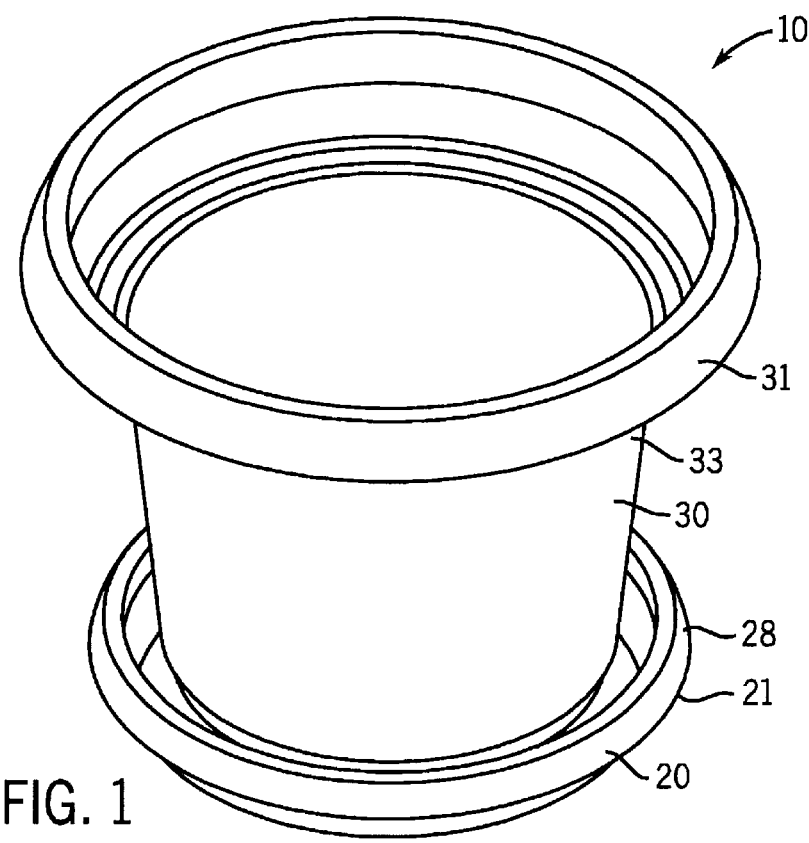
FIG. 1 is perspective view of a flower pot assembly in accordance with one embodiment of the invention.

A flower pot assembly constructed in accordance with the invention is shown generally at 10 in FIG. 1. The flower pot assembly 10 includes a tray 20 and a flower pot 30. According to one embodiment of the invention, the flower pot 30 may include a tray upper ridge 31 on the upper portion 33 thereof, while the tray may also include an upper ridge 31. The flower pot ridge 31 and the tray upper ridge 31 may be used both for decorative purposes and to impede portions of the plant and/or dirt from spilling over the side of the flower pot assembly 10.

Figure 2:
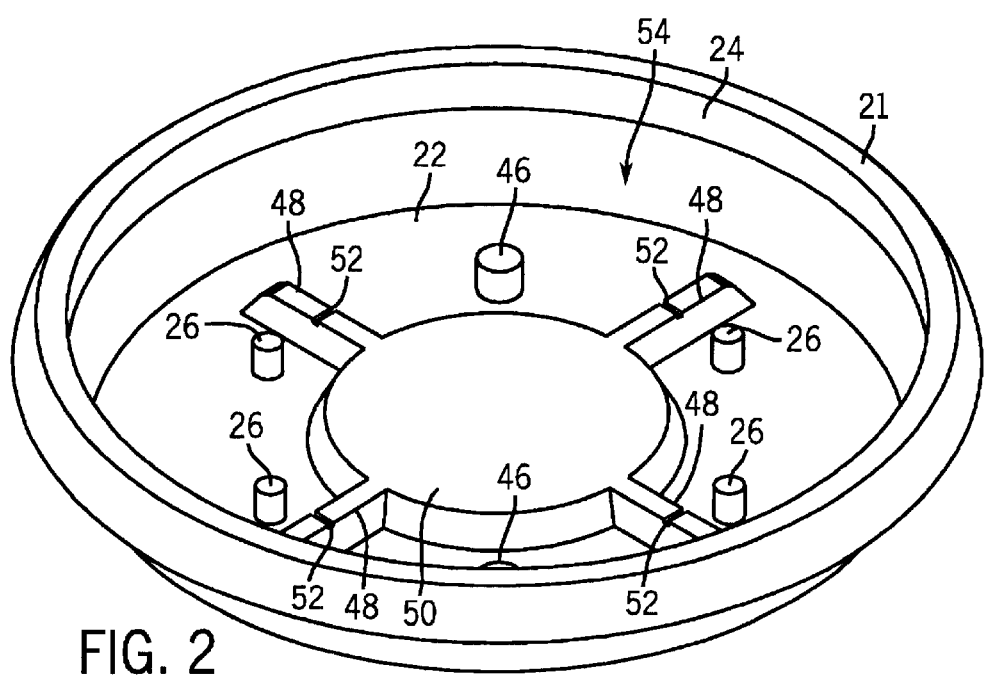
FIG. 2 is a perspective view of the assembly tray of FIG. 1.
Figure 4:
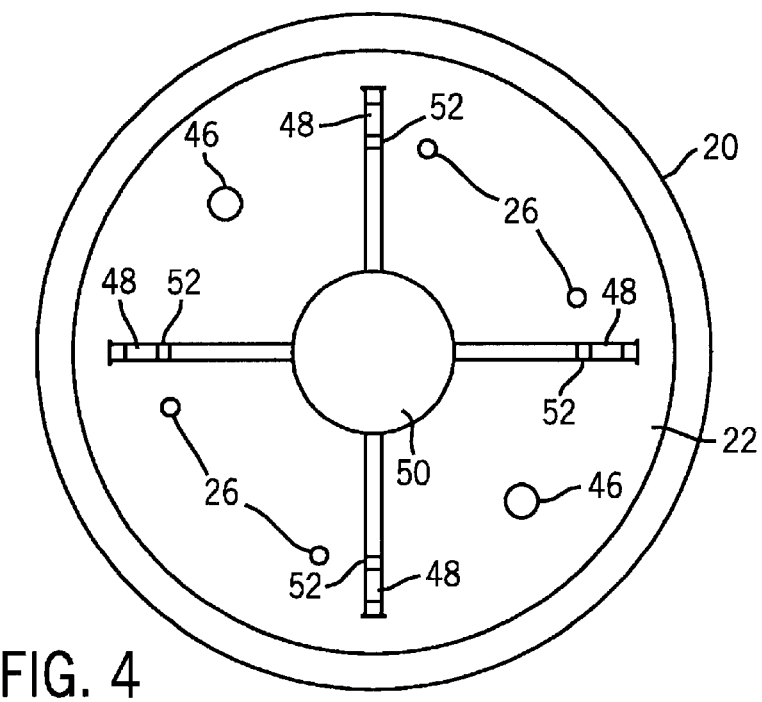
FIG. 4 is a bottom view of the assembly tray of FIG. 2.

As shown in FIGS. 2 and 4, the tray 20 includes a bottom surface 22 bounded by a side wall 24. In a preferred embodiment of the invention, there is a single side wall 24 that bounds the bottom surface 22, although additional side walls may be possible.

The bottom surface 22 of the tray 20 includes a plurality of ribs 48 projecting upward into a holding portion 54 defined by the bottom portion 22 coupled to the side wall 24. In one preferred embodiment of the invention, there are four ribs 48 which are evenly distributed and radically and symmetrically positioned around the center of the bottom portion 22.

Also distributed around the bottom surface 22 of the tray 20 are a plurality of small projections 26 and a plurality of large projections 46. In one preferred embodiment of the invention, there are four small projections 26 and two large projections 46 on the bottom surface 22 of the tray 20. In this particular embodiment, the small projections 26 and the large projections 46 are arranged such that two small projections 26 are grouped together between two of ribs 48, while each large projection 46 is placed by itself between two of the ribs 48 substantially opposite each other relative to the center of the bottom portion 22. In a preferred embodiment of the invention, both the small projections 26 and the large projections 46 project upwardly substantially the same distance as the plurality of the ribs 48. According to one embodiment of the invention, the plurality of the ribs 48 each include a groove 52 positioned substantially transverse to the major axis of each of plurality of ribs 48.

In one embodiment of the invention, the bottom portion 22 of the tray 20 includes an elevated central portion 50 which is positioned substantially in the center of the bottom portion 22 of the tray 20. In one embodiment of the invention, the elevated central portion 50 projects substantially the same distance upward as the ribs 48, the small projections 26 and the large projections 46. Additionally, the elevated central portion 50 is integrally formed with the plurality of ribs 48.

Figure 3:
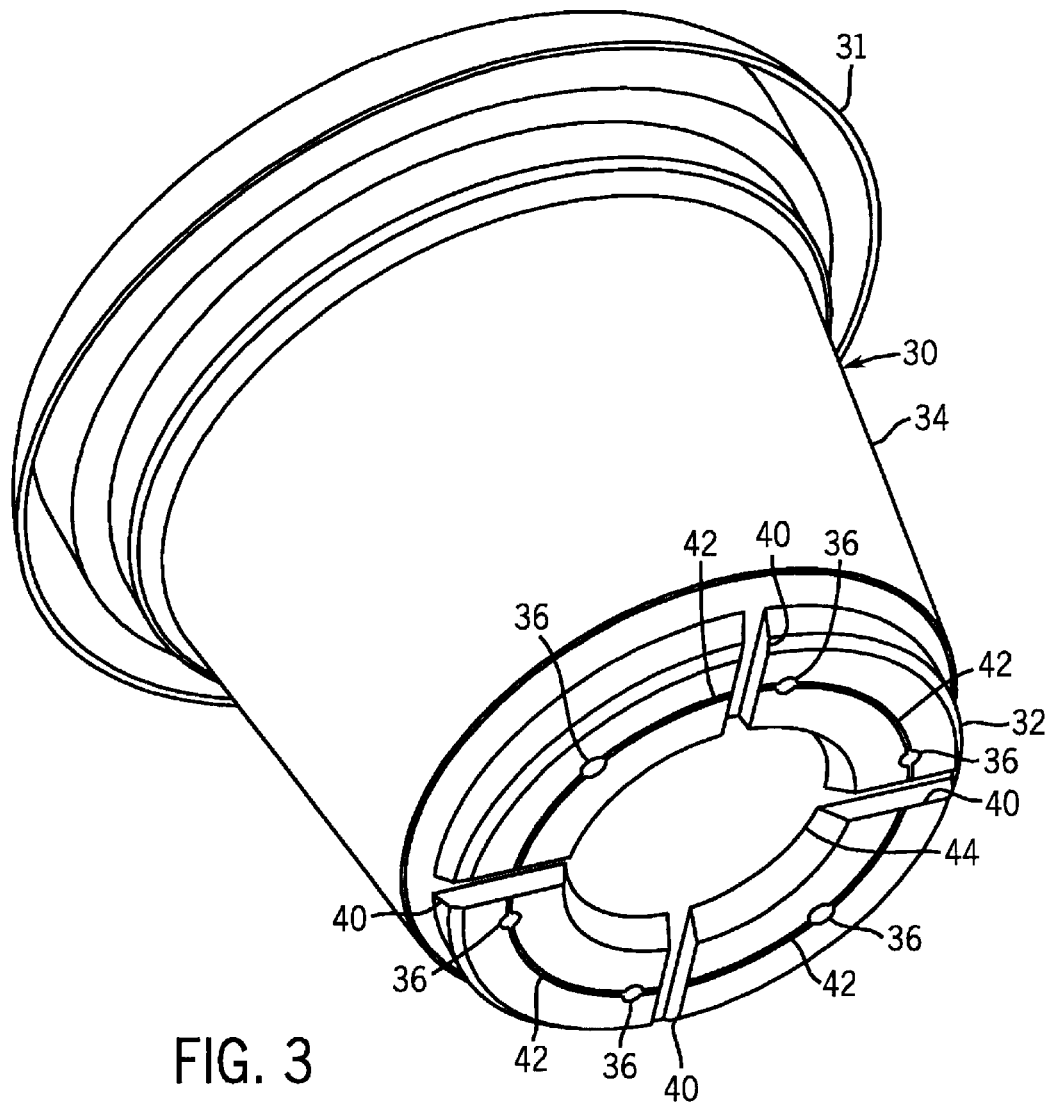
FIG. 3 is an inverted perspective view of the flower pot of FIG. 1.

As shown in FIG. 3, the flower pot 30 includes a lower surface 32 that is bounded by a side wall 30, In a most preferred embodiment of the invention, a single side wall 34 bounds the lower surface 32. It is possible, however, for there to be additional side walls in the flower pot 30. The flower pot 30 includes a plurality of joining regions 36 on the bottom surface 32 thereof. In one embodiment of the invention, the joining regions 36 comprise depressed regions. In an alternate embodiment of the invention, there is a complete void of material at this site. Both features could be used while remaining within the invention's broader aspects. In one embodiment of the invention, the joining regions 36 are evenly distributed and are located in a substantially radially symmetrical pattern about the lower surface 32 of the flower pot 30.

The lower surface 32 of the flower pot 30 also includes a plurality of channels 40 preferably evenly distributed and radially and symmetrically positioned around the center of the lower surface 32 of the flower pot 30. In one embodiment of the invention, the joining regions 36 and the plurality of channels 40 are arranged such that there are two joining regions 36 between channels 40 in two positions, and one joining region 36 between channels 40 in two other positions.

The lower surface 32 of the flower pot 30 also includes a central depressed portion 44 in the center of the lower surface 32. In one most preferred embodiment of the invention, the central depressed portion 44 is depressed substantially the same distance as the deepest portion of the plurality of channels 40. In another most preferred embodiment of the invention, the plurality of channels 40 are integrally joined to the depressed central portion 44. The lower surface 32 also includes a circular ridge 42 that encircles the entire lower surface 32 of the flower pot 30. In a preferred embodiment of the invention, the circular ridge 42 passes directly through the plurality of joining regions 36.

Figure 5:
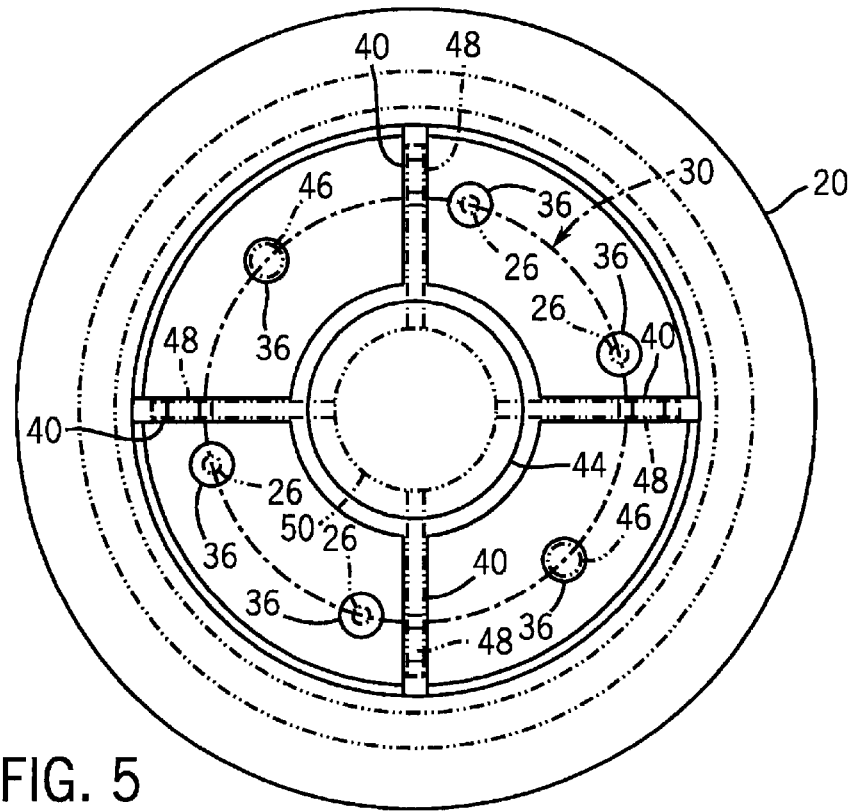
FIG. 5 is a top view of the flower pot in a first position relative to the tray.

As shown in FIG. 2, the plurality of small projections 26, the large projections 36, and the plurality of joining regions 46 are capable of mating with each other to varying degrees depending upon the relative positions of the plurality of channels 40 and the plurality of ribs 48 relative to each other. As shown in FIG. 5, when the flower pot 30 and the tray 20 are in a first position, each of the plurality of joining regions 36 line up with the plurality of smaller projections 26 and a larger projection 46. In this first position, the flower pot 30 is capable of snuggly fitting with the tray 20, effectively locking the flower pot 30 in place. In this position, the flower pot 30 also has an increased level of stability. Additionally, the channels 40 line up and mate with the ribs 48, and the elevated central portion 50 mates with the central depressed portion 44.

Figure 6:
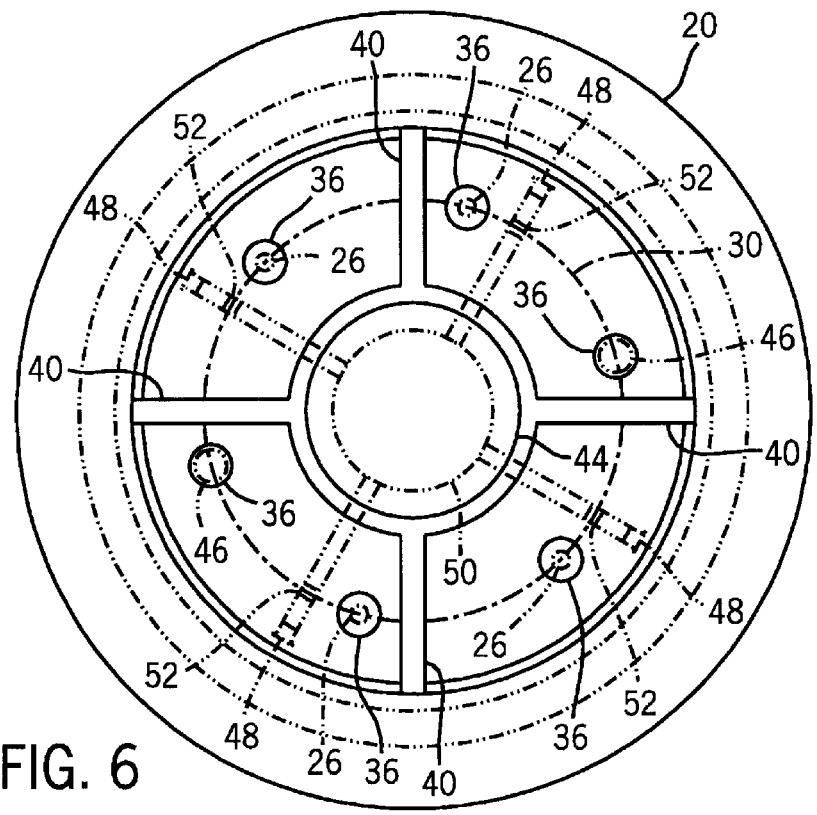
FIG. 6 is a top view of the flower pot in a second position relative to the tray.

As shown in FIG. 6, when the flower pot 30 is in a second position, the plurality of channels 40 do not substantially line up with the plurality of the ribs 48. The plurality of joining regions 36, however, do line up with the plurality of the smaller projections 26 and the larger projections 46. This is due to the fact that there are not an equal number of the smaller projections 26 and the larger projections 46 between groups of the ribs 48 on the tray 20, just as there are not a constant number of the joining regions 36 between the channels 40 on the flower pot 30. As a result, the flower pot 30 does not mate as closely with the tray 20 as is the case when the flower pot 30 is in the first position. When the flower pot 30 is in the second position, however, the ridge 42 on the lower surface thereof mates with the groove 52 on the ribs 48 of the bottom surface 22 of the tray 20. The mating of the ridge 42 with the groove 52 serves to guide the flower pot 30 and the tray 20, impeding their movement relative to each (albeit to a smaller extent than when the flower pot 30 is in a first position). The elevated central portion 50 may also mate with the central depressed portion 44 to a lesser extent than it otherwise would when the flower pot 30 is in the first position.

When in the second position, it is easier to remove the flower pot 30 from the tray 20. Additionally, the arrangement of the second position allows for additional amounts of water and or other materials to pass through the joining regions 36 when the joining regions 36 comprise a plurality of voids. This can be beneficial in the instance where a plant is over-watered, as fluid will drain through the lower surface 32 of the flower pot 30 instead of spilling over the upper rim 38.

Figure 7:
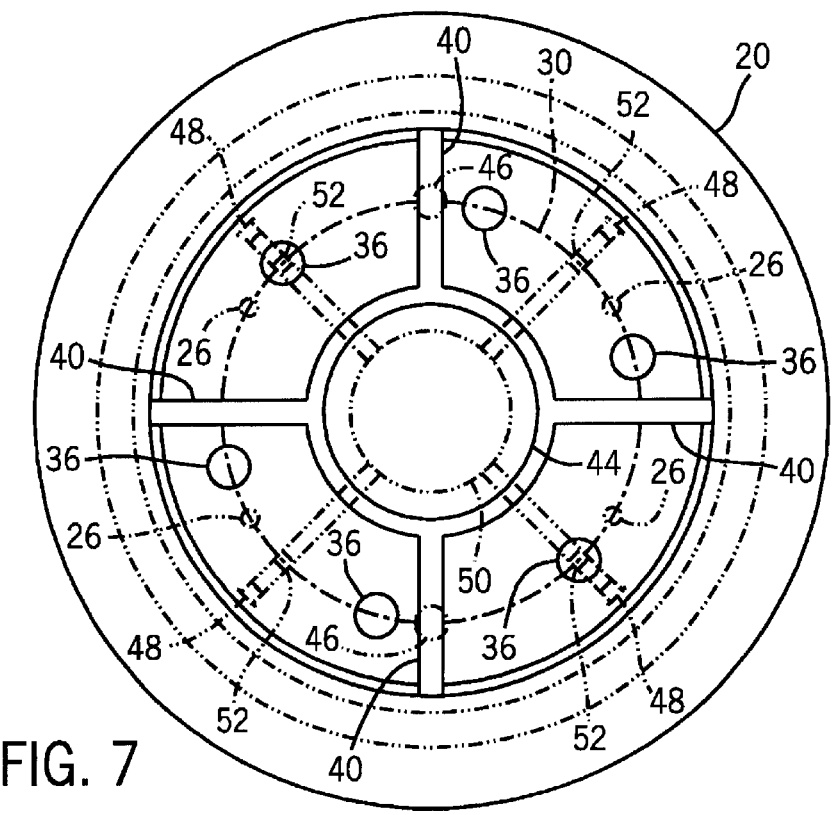
FIG. 7 is a top view of the flower pot in a third position relative to the tray.

In the third position and as shown in FIG. 7, the plurality of the ribs 48 do not align with the plurality of the channels 40. Likewise, the smaller projections 26 or the larger projections 46 do not align with the plurality of joining regions 36. In this third position, the ridge 42 may still align and mate to a degree with the groove 52, but any mating is not nearly as pronounced as when the flower pot 30 is in either the first position or the second position relative to the tray 20. Instead, the flower pot 30 substantially rests on top of the plurality of ribs 48. When in the third position, the flower pot 30 is easily removable from the tray 20.

Additionally, it should be noted that, by having all of the smaller projections 26, the larger projections 46, the ribs 48 and the central elevated portion 50 being of substantially the same height, it is possible to use a tray 20 of the present invention with other unassociated flower pots 30, increasing the overall usefulness of the tray 20.

While preferred embodiments of the invention have been shown and described, it will be clear to those skilled in the art, that potential modifications can be made to the embodiments described above. For example, the projections can be of a single size or of multiple sizes, and the arrangements of projections, ribs, channels, and joining regions can be placed in varying arrangements. Additionally, it is possible that the joining regions and projections can be reversed; the joining regions can be placed on the tray and the projections placed on the flower pot. The same reversal holds true for the ribs and channels. It will therefore be well understood by those in the art that the invention is capable of other embodiments and of being practiced or being carried out in various ways, and that modifications can be made to the above embodiments without departing from the invention in its broader aspects.

What is claimed is:

1. A pot arrangement, comprising:
    a base including:
        at least one side wall; and
        a bottom surface engaging the at least one side wall and forming a holding region therewith, the bottom surface having a plurality of ribs protruding into the holding region and a plurality of projections protruding into the holding region; and
    a flower pot including a lower surface and a side wall, the lower surface having a plurality of channels and a plurality of depressions,
    wherein when the flower pot is in a first position, the plurality of ribs on the bottom surface of the base mate with the plurality of channels on the flower pot and the plurality of projections on the bottom surface of the base mate with the depressions on the flower pot, and wherein when the flower pot is in a second position, the plurality of projections on the bottom surface of the base mate with the depressions on the flower pot while the plurality of ribs on the bottom surface of the base do not mate with the plurality of channels on the flower pot.

2. The pot arrangement of claim 1, wherein the bottom surface of the base includes at least one groove on the plurality of ribs, the at least one groove mating with at least one ridge on an outside portion of the flower pot when the flower pot is in the first position.

3. The pot arrangement of claim 2, wherein the bottom surface of the base includes an elevated central portion that mates with a central depression on the flower pot when the flower pot is in the first position.

4. The pot arrangement of claim 3, wherein the elevated central portion is elevated to substantially same level as the plurality of ribs.

5. The pot arrangement of claim 4, wherein the elevated central portion is operatively connected to the plurality of ribs.

6. The pot arrangement of claim 5, wherein the plurality of projections are spaced substantially equidistant from each other.

7. The pot arrangement of claim 3, wherein when the flower pot is in a third position, the lower surface of the flower pot resting upon the plurality of ribs without the plurality of channels mating with the plurality of ribs.

8. The pot arrangement of claim 7, wherein a diameter of the bottom surface of the base is larger than a diameter of the lower surface of the flower pot.

9. The pot arrangement of claim 8, wherein the base is arranged such that the plurality of ribs and plurality of projections are arranged to support unassociated flower pots.

10. A flower pot assembly, comprising:
a base including a side wall and a bottom surface engaging the side wall and forming a holding region therewith, the bottom surface having a plurality of ribs, a plurality of projections and a central elevated portion protruding into the holding region; and
a flower pot including a lower surface and a side wall, the lower surface having a plurality of channels, a plurality of depressions, and a central depressed portion,
wherein when the flower pot is in a first position, the plurality of ribs on the bottom surface of the base mate with the plurality of channels on the flower pot and the plurality of projections on the bottom surface of the base mate with the depressions on the flower pot, wherein when the flower pot is in a second position, the plurality of projections on the bottom surface of the base mate with the depressions on the flower pot while the plurality of ribs on the bottom surface of the base do not mate with the plurality of channels on the flower pot, and wherein when the flower pot is in a third position, the lower surface rests upon at least one of the plurality of ribs, the plurality of projections, and the central elevated portion.

11. The flower pot assembly of claim 10, wherein the lower surface of the flower pot includes a ridge, the ridge mating with a groove on the bottom surface of the base when the flower pot is in the first position.

12. The flower pot assembly of claim 11, wherein the ridge is formed on the plurality of ribs.

13. The flower pot assembly of claim 12, wherein the plurality of projections and the plurality of depressions include a circular shape.

14. The flower pot assembly of claim 13, wherein the elevated central portion is elevated to substantially the same level as the plurality of ribs.

15. The flower pot assembly of claim 14, wherein the plurality of projections are substantially equidistant from each other, and wherein the plurality of depressions are substantially equidistant from each other.

16. The flower pot assembly of claim 15, wherein the plurality of projections are substantially equidistant from the center of the bottom surface of the base, and wherein the plurality of depressions are substantially equidistant from the center of the lower surface of the flower pot.

17. A base for a flower pot, comprising:
a side wall;
a horizontal member substantially transverse to and joining the side wall, the side wall and the horizontal member forming an upper region for the placement of a flower pot, the horizontal member including:
a plurality of projections protruding into the upper region for mating with a plurality of depressions on a bottom side of an associated flower pot;
a plurality of ribs protruding into the upper region for mating with a plurality of channels on the bottom side of the associated flower pot; and
a central projection protruding into the upper region for mating with a central region on the bottom side of the associated flower pot,
wherein when the associated flower pot and the universal base are in a first position, the plurality of projections mate with the plurality of depressions, the plurality of ribs mate with the plurality of channels, and the central projection mates with the central region such that the associated flower pot is inhibited from rotating relative to the universal tray,
wherein when the associated flower pot and the universal base are in a second position, the plurality of projections mate with the plurality of depressions while still permitting a fluid to pass through depressions into the region,
and wherein when the associated flower pot and the universal base are in a third position, the associated flower pot rests upon the plurality of ribs.

18. The universal base of claim 17, wherein the plurality of projections comprise a circular shape.

19. The universal base of claim 18, further comprising a groove on the horizontal member for mating with the associated flower pot.

20. The universal base of claim 19, wherein the central projection rises to substantially the same level as the plurality of ribs.

21. The universal base of claim 20, wherein the plurality of projections are spaced substantially equidistant from the center of the horizontal member.

* * * * *

UNITED STATES PATENT AND TRADEMARK OFFICE
CERTIFICATE OF CORRECTION

PATENT NO. : 6,510,653 B1
DATED : January 28, 2003
INVENTOR(S) : Paul Workum, Mitchell W. Workum and Victoria A. Talmadge It is certified that error appears in the above-identified patent and that said Letters Patent is hereby corrected as shown below:

Title page,
Item [57], ABSTRACT,
Line 7, "have" is -- has --.

Column 2,
Line 20, "tray" is -- pot --.
Line 22, "31" both occurrences is -- 21 --.
Line 65, "30, In" is -- 30. In --.

Column 3,
Line 36, "46" is -- 36 --.

Column 4,
Line 12, "38" is -- 31 --.

Column 6,
Lines 31, 38, 44, 46, 48, 51 and 54, "universal" is deleted.

Signed and Sealed this

Fifteenth Day of February, 2005

JON W. DUDAS
*Director of the United States Patent and Trademark Office*